United States Patent [19]

Gournay

[11] Patent Number: 4,596,139
[45] Date of Patent: Jun. 24, 1986

[54] DEPTH REFERENCING SYSTEM FOR A BOREHOLE GRAVIMETRY SYSTEM

[75] Inventor: Luke S. Gournay, Rockwall, Tex.

[73] Assignee: Mobil Oil Corporation, New York, N.Y.

[21] Appl. No.: 695,811

[22] Filed: Jan. 28, 1985

[51] Int. Cl.$^4$ .............................................. E21B 47/04
[52] U.S. Cl. .................................. 73/151; 73/DIG. 4
[58] Field of Search .................. 73/708, 754, DIG. 4, 73/151, 152, 382 R, 382 G; 166/250

[56] References Cited

U.S. PATENT DOCUMENTS

| | | | |
|---|---|---|---|
| 3,031,591 | 4/1962 | Cary et al. | 73/754 |
| 3,978,939 | 9/1976 | Trouiller | 250/268 |
| 4,399,693 | 8/1983 | Gournay | 73/152 |
| 4,455,875 | 6/1984 | Guimard et al. | 73/708 |
| 4,475,386 | 10/1984 | Fitch et al. | 73/152 |

FOREIGN PATENT DOCUMENTS 529035  8/1956  Canada ........................ 73/DIG. 4

Primary Examiner—Stewart J. Levy
Assistant Examiner—Robert R. Raevis
Attorney, Agent, or Firm—A. J. McKillop; Michael G. Gilman; George W. Hager, Jr.

[57] ABSTRACT

A borehole gravimetry system employs a pair of pressure transducers for lowering into a borehole along with a borehole gravity meter. The pressure transducers are spaced apart vertically within a pressure sonde for producing a pressure differential measurement of the wellbore fluid. A first of the transducers is hydraulically isolated from borehole fluid pressure while the second of the transducers is in hydraulic contact with the borehole fluid so as to be exposed to the borehole fluid pressure. The second transducer is thermally insulated from borehole temperature to achieve thermal time constant equalization between the pair of transducers. A pressure differential measurement and a gravity reading is taken for each of a plurality of vertical locations within the borehole as the borehole gravimetry system is advanced through the borehole and from these measurements bulk density is determined.

2 Claims, 5 Drawing Figures

DEPTH REFERENCING SYSTEM FOR A BOREHOLE GRAVIMETRY SYSTEM

BACKGROUND OF THE INVENTION

Borehole gravimetry has now been developed into a reasonably reliable tool for oil well logging. Borehole gravimetric techniques provide an indication of the bulk density of formation rock surrounding the borehole being logged. In applications of formation gravity measurements, it is only the gravity gradient that is of interest since the gradient is related to the bulk density of the formation between the measurement stations according to well-known formulas. From this bulk density, estimates can be obtained of porosity and fluid saturation in the porous rocks of the formation. This gravity gradient has been determined by measuring the gravity difference of any two points along the formation and then dividing by the vertical distance separating the two points.

Current gravity technology measures gravity at discrete points along a formation by detecting motion of a small test mass in a gravity logging tool as the tool remains stationary. Small changes in gravitational acceleration cause this mass to move against the restoring force of a spring. Various approaches to the detection of this minute movement are possible. One such method is illustrated in detail in U.S. Pat. No. 4,399,693, to L. S. Gournay. The general arrangement of a gravimetric exploration operation as well as a conventional LaCoste and Romberg-type gravity meter of the mass-spring cmbination is shown in such Gournay patent. Also in the Gournay patent is the standard formula for computing formation bulk density from the gravity difference measurements. These gravity difference measurements must be made when the tool is motionless with respect to the formation. Such tool is not practical for making continuous measurements since there is no accurate means for eliminating the force on the test mass due to tool acceleration, and consequently, accurate gravity readings cannot be made with the tool in motion. This limitation requires that the gravity tool be stopped for a period of several minutes at each point or station along the formation at which a gravity difference measurement is desired. Gravimetric logging services now commercially available include that provided by Exploration Data Consultants (EDCON) of Denver, Colo., using a gravity meter of the type developed by LaCoste and Romberg.

SUMMARY OF THE INVENTION

In accordance with the present invention, there is provided a borehole gravimetry survey for subsurface formations.

A borehole is simultaneously traversed with a borehole gravity meter and a pressure logging sonde having a pair of pressure tranducers located at spaced apart axial positions along the sonde and in fixed axial relationship with the borehole gravity meter. A first of the pressure tranducers is a reference crystal, which is hydraulically isolated from the borehole fluid pressure, and a second of the pressure transducers is a sensor crystal, which is in hydraulic contact with the borehole fluid so as to be exposed to the borehole fluid pressure.

The traversing of the borehole with the gravity meter and the pressure logging sonde is periodically stopped to take borehole gravity and borehole fluid pressure measurements at a plurality of measurement locations having varying temperatures within the borehole. The sensor pressure transducer is thermally stabilized with respect to the reference pressure transducer through the equalization of their thermal time constants. This is accomplished through thermal insulation of the sensor pressure transducer from the borehole temperature by surrounding such sensor pressure transducer with insulating material at least along the portion of the logging sonde in juxtaposition with the sensor pressure transducer. Such insulating material increases the time constant of the sensor pressure transducer with respect to the time constant of the reference pressure transducer. Sufficient insulating material is provided to equalize the pressure measurements of the reference and sensor pressure transducers within a time period of no greater than five minutes after the logging sonde has been moved through the borehole to a new pressure measurement location.

The pair of thermally equalized pressure measurements at a first of the measurement locations within the borehole and at a second of the measurement locations are used to determine the distance along the borehole between the first and second measurement locations. The bulk density of the formation surrounding the borehole is determined from the plurality of gravity measurements and the distances traveled by the gravity meter between such gravity measurements.

DESCRIPTION OF THE PREFERRED EMBODIMENT

Figure 1:
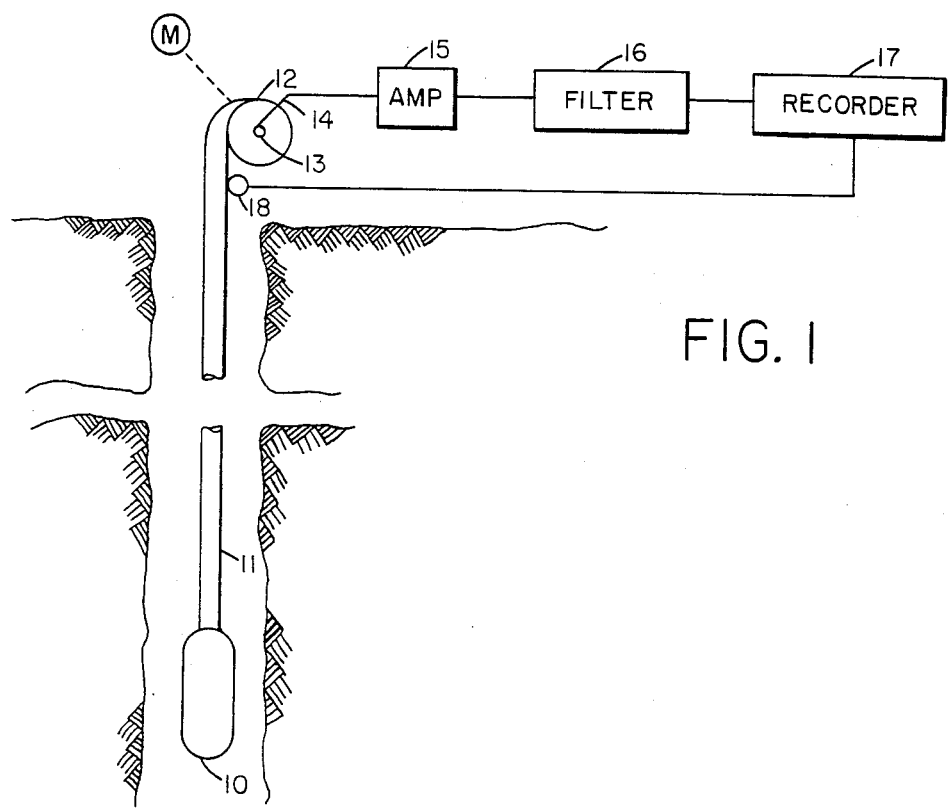
FIG. 1 illustrates a borehole gravimetry system of the prior art.

As mentioned above, borehole gravimetry has now been developed into a reasonably reliable tool for oil well logging. The general arrangement of gravimetric exploration operations is shown in FIG. 1. The LaCoste and Romberg type gravity meter 10 is passed down through a well extending from the surface of the earth through formations of various types until the area of interest is reached. The gravity meter 10 is lowered by means of a cable 11 running over a sheave 12, to the depth of interest. Gravimetric measurements, yielding signals proportional to the density of the surrounding formation, are then made and conducted by way of slip rings 13 and brushes 14 to an amplifier 15, a filter 16, and a recorder 17 to produce a log of gravity measurements as a function of depth. This is a log of true gravity over the depth interval of interest, such depth interval being measured by the reel 18 rotatably coupled to the cable 11.

Figure 2:
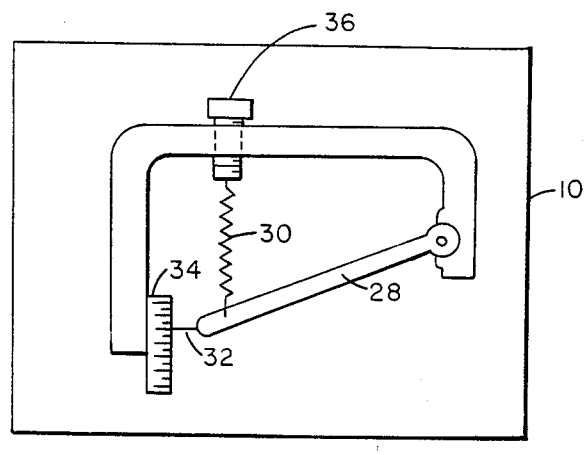
FIG. 2 illustrates a borehole gravity meter suitable for use in carrying out borehole gravity surveys.

FIG. 2 shows a schematic depiction of the LaCoste and Romberg gravity meter; other types of gravity meters are within the scope of the present invention. A lever 28 is pivoted more or less against the bias of a spring 30 in accordance with the vertical component of the earth's gravity in its immediate locale. This meter is capable of yielding results proportional to the density of the formation within a radius of about 100 feet of the borehole itself. A pointer 32 is affixed to the end of the pivoted lever 28 and indicates a point on a scale 34. The spring 30 is connected to a pre-load screw 36 which is moved in order to cause the lever pointer 32 to reach a predetermined index point on the scale 34. The amount of adjustment of the preload required to index the pointer 32 is proportional to local variations in gravity; thus the preload adjustment is effectively the data output by the gravity meter 10. The meter is sealed within an enclosed container before being passed down the hole.

The borehole gravity meter, as the name implies, simply measures the vertical component of the earth's gravitational acceleration at a desired depth in the borehole. Given measurements at two different depths, one obtains the gravitational gradient and can proceed to compute the formation bulk density $\tau_b$ from the following equation:

$$\rho_b = \frac{F - (\Delta g/\Delta Z)}{4 \pi G} \tag{1}$$

where

F is the free air gradient;

$\Delta g$ is the gravity difference between the two readings;

$\Delta Z$ is the vertical distance between gravity measurement stations; and

G is the universal gravitational constant.

Written in units of microgals (one gal—1 cm/sec$^2$) for $\Delta g$, gm/cc for $\rho_b$, and feet for $\Delta Z$, we have:

$$\rho_b = 3.687 - 0.039185 \, \Delta g/\Delta Z. \tag{2}$$

The bulk density $\rho_b$ is representative of the horizontal slab of material that lies within $\Delta Z$; it is the accurate determination of $\tau_b$ by gravimetric techniques which makes a reliable residual oil determination feasible.

As noted above, the gravity meter of FIG. 2 is of conventional design, its details forming no part of the present invention. Similarly, the operations shown schematically in FIG. 1 are presently commercially available from logging contractors and similarly form no part of the present invention. Instead, the present invention relates to a depth referencing system for more accurately determining the vertical distance, $\Delta Z$, between the gravity measurement stations. The accuracy of the determination of bulk density is very sensitive to the accuracy with which the vertical distance between measurement stations can be measured. Fairly accurate measurements of vertical distance can be made from land-based or fixed-platform offshore well locations, if the wells from such locations are vertical. In the case of non-vertical or deviated wells, sufficiently accurate measurements of vertical distance may not be possible. Further, in the case of wells drilled from floating drilling vessels, sufficiently accurate measurements of vertical distance are generally impossible, due to uncontrollable vertical motions of such drilling vessels. Although undesirable motions of the borehole gravity sonde due to such vessel motions may be prevented by clamping the sonde to the borehole wall, accurate measurement of the vertical location of the sonde is still a problem. The depth referencing system of the present invention is directed toward measuring vertical distance accurately under all such operating conditions.

Figure 3:
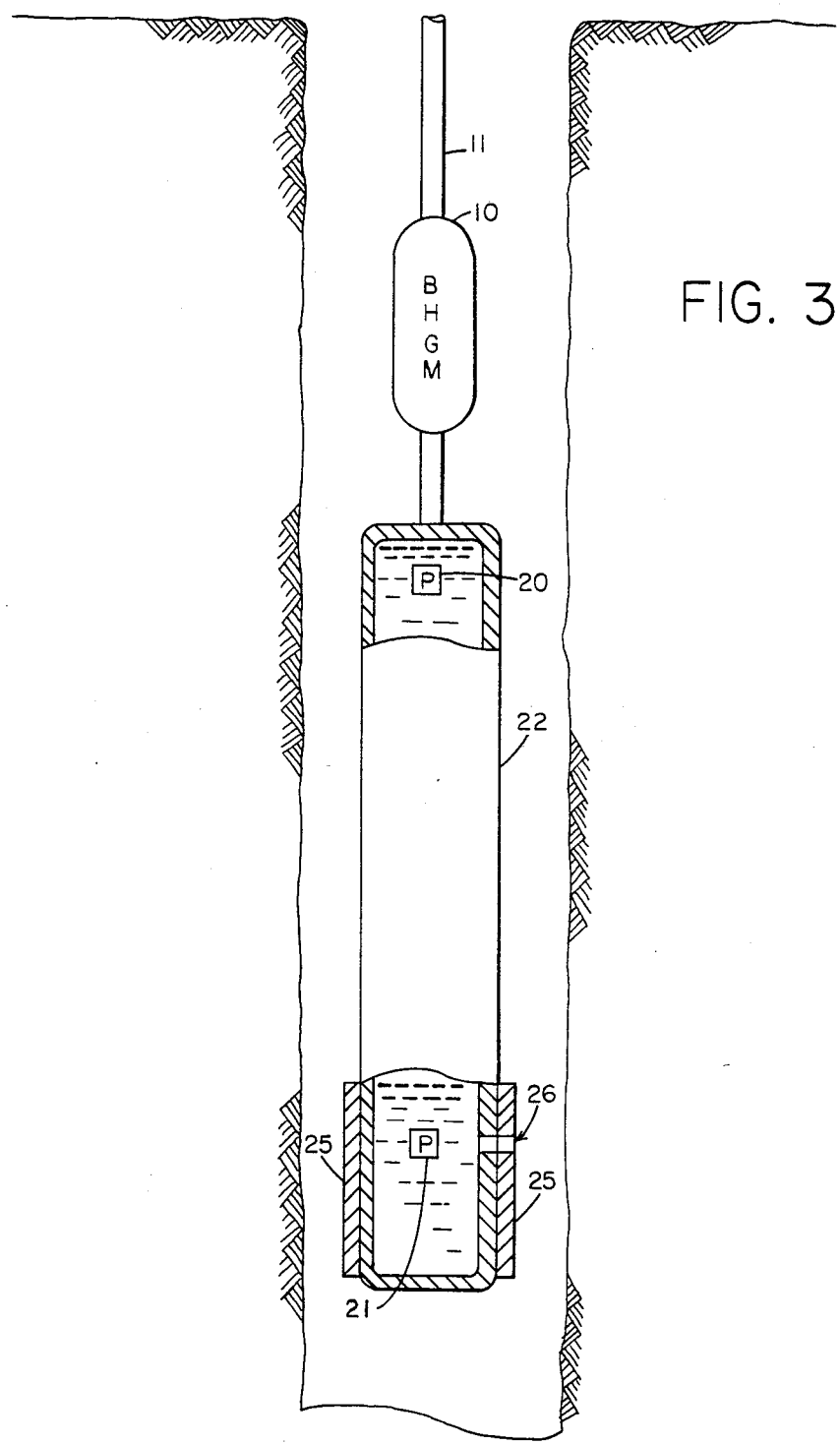
FIG. 3 illustrates the borehole gravimetry system for carrying out the borehole gravity survey of the present invention.
Figure 4:
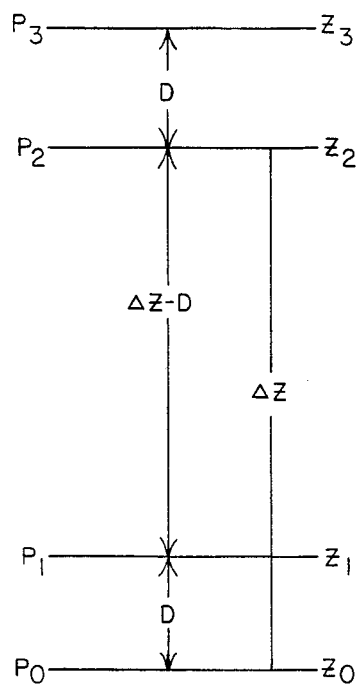
FIG. 4 is a diagrammatic representation of the borehole gravity survey to be carried out by the borehole gravimetry system of FIG. 3.

The depth referencing system is shown in FIG. 3 and employs a pair of transducers 20 and 21 housed in a pressure sonde 22 and lowered into the borehole by cable 11 along with the borehole gravity meter 10. The pressure sonde may be located either above or below the borehole gravity meter. When the borehole gravity meter moves a distance Z, the pressure sonde would also move the same distance. FIG. 4 illustrates diagrammatically the pair of pressure transducers, separated by the distance D and located at the vertical positions $Z_0$ and $Z_1$ within the borehole. At these two vertical positions wellbore fluid pressure measurements, $P_0$ and $P_1$, are made along with the borehole gravity measurement and transmitted to the surface. Next the borehole gravity meter and the pressure sonde are moved upward through the borehole the distance $\Delta Z$ and stopped at a point where the pair of pressure transducers are located at the vertical positions $Z_2$ and $Z_3$. Wellbore fluid pressure readings $P_2$ and $P_3$ are now taken and trasmitted to the surface along with the borehole gravity measurement for this location in the borehole. The foregoing is repeated for as many depth locations as desired within the borehole.

These wellbore fluid pressure measurements are utilized to accurately determine the vertical distance $\Delta Z$ between two gravity measurement stations. The pressure difference $\Delta P$ between two points in a fluid-filled borehole separated by a vertical distance $\Delta Z$ is given by the following:

$$\Delta P = \rho_f g \Delta Z \tag{3}$$

where $\rho_f$ is the fluid density, and g is the gravitational acceleration.

Thus, the vertical distance $\Delta Z$ can be represented as follows:

$$\Delta Z = \frac{\Delta P}{\rho_f g} \tag{4}$$

By the use of a highly sensitive pressure gauge for transducers 20 and 21, such as a quartz crystal device, sufficiently accurate measurement of $\Delta P$ can be made when the fluid density is known. By means of two such sensitive pressure gauges, an accurate determination of the fluid density can be made. In a preferred embodiment, a pair of pressure gauges are mounted in the pressure sonde with vertical separation of about two feet, and the sonde is clamped to the borehole wall by means of a downwhole clamp. One such sonde with quartz pressure crystals is the Hewlett-Packard Model 2813B Quartz Pressure Probe. Hewlett-Packard also supplies the Model 2816A Pressure Signal Processor. A suitable downhole clamp is the model R 1462 supplied by Geosystems Div.-Geosource, Inc., Fort Worth, Tex., during borehole fluid pressure mesurements. Various other means have been used in the past to clamp borehole tools to the borehole wall, such as the bow spring clamp of U.S. Pat. No. 4,180,727; the spring biased clamp of U.S. Pat. No. 3,340,953; and the hydraulic clamping means of U.S. Pat. No. 3,978,939.

Prior art pressure measuring sondes, such as the aforementioned Hewlett-Packard model, is normally used in oil and gas well testing where pressure changes are measured over an extended period of time. Generally, the sonde is positioned at one location in a wellbore, as shown in FIG. 3, and left at that location during the course of these pressure measurements. The sonde 22 consists of two crystals and associated electronics in a steel housing. A first crystal 20 is located inside the snode and is isolated from external fluid pressure. It is held at a constant pressure, close to atmospheric pressure. A second crystal 21 is located so as to be in hydraulic contact with the external wellbore fluid and is exposed to the pressure in this fluid. Each crystal is in an oscillator circuit and oscillates at its particular resonant frequency. This resonant frequency is a function of the stress on the crystal and, therefore, is a function of the pressure on the crystal. Harmonic frequencies of the two crystals are mixed, and a sum difference frequency is obtained. This sum and difference is a function of the difference in fluid pressure between the first and second crystals. The two crystals are almost thermally matched, i.e., if the temperature of the sonde is slowly changed, the fluid pressure will be closely given by a set of equations that contain empirical constants and the value of temperature. However, the thermal response of the two-crystal system is slow. If the sonde is moved from a location with one temperature to a location with a different temperature, thermal equilibration can require one to several hours. During this time of equilibration, the output frequency will slowly vary and gradually approach a steady state value. It has been found that this slow change is due to a difference in thermal time constant of the two crystals. Because the second crystal 22 is in better thermal contact with the wellbore fluid, it reaches thermal equilibrium faster than the first crystal 21.

Figure 5:
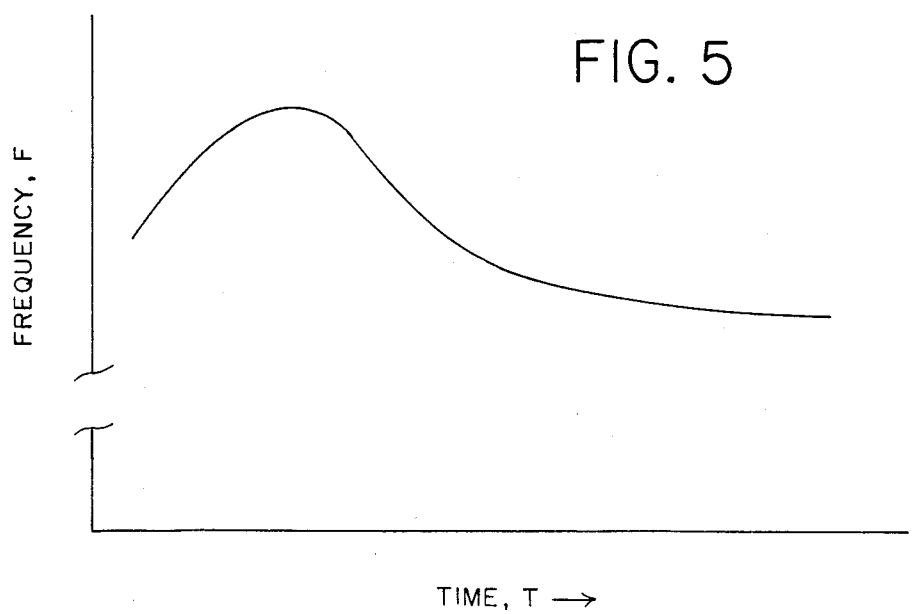
FIG. 5 illustrates output frequency as a function of time for thermal stabilization of the logging system of FIG. 3.

There are borehole gravity logging applications where the sonde is moved rapidly from one thermal location to another (within a matter of 5 minutes). In these applications, it is not tolerable to wait an hour or more for thermal equilibration to be accomplished, yet any pressure reading taken during thermal equilibration period would be inaccurate. An example of this application is a wellbore filled with fluid. The vertical temperature gradient near the earth's surface is typically 1.2° F. per 100 feet. Thus, if the sonde is moved ten feet vertically, its temperature is changed by 0.12° F. Such a change normally requires approximately one hour for the output frequency to stabilize. This effect is one of thermal stabilization, not pressure stabilization. When the output frequency is monitored as a function of time after moving to new depth, it is observed to follow a rate of change given by two exponential forms. The general behavior is shown in FIG. 5 and can be mathematically described by the following equation:

$$f = F(1 - \exp(-t/T1)) + F(\exp(-t/T2)).$$

where:
 f = observed frequency,
 F = stablized frequency,
 t = time,
 T1 = time constant of first crystal, and
 T2 = time constant of second crystal.
It is experimentally observed that T1 is different from T2. The above equation can be expanded into:

$$f = F - F \exp(-t/T1) + F \exp(-t/T2).$$

Now we see that if T1 were equal to T2, there would be no time dependence of the frequency, the thermal equilibration problem would be solved, and valid readings could be taken soon after moving from one depth to another.

It has been observed that the first crystal 21 has the longer thermal time constant; it is more isolated from the environment and takes more time to reach a new fluid temperature. Thus, one has two choices in making T1 = T2. One can either try to shorten T1 or lengthen T2. T1 is approximately 10 times T2, and it would have to be reduced by a factor of 10 to accomplish the objectives. This feat would entail a difficult, if at all possible, change in thermal conductivity for the first crystal 21. It is instead, much easier to alter T2 by making it longer. This is achieved by applying thermal insulation about the second crystal 22 such that it reaches thermal equilibrium at the same rate as the first crystal 21.

Such thermal equilibrium problem is solved by wrapping an insulating material around the steel sonde at the location of the second crystal 22. In one method, a band of MYLAR is wrapped around the sonde at this location. On the first try, the required thickness of MYLAR is not known. After applying the first thickness of MYLAR, the time constants T1 and T2 are again measured. Noting the new value of T2, more or less insulation is wrapped around the sonde, and the time constants T1 and T2 are again measured. Using this procedure, the correct amount of insulation is identified. Once this value is reached, it is found experimentally that the pressure sonde can be rapidly moved tens of feet and a valid pressure reading can be taken within 5 minutes or less after the sonde is repositioned.

In the alternative, to the steps outlined above, the thermal transfer process can be computed and the amount and location of insulation can be computed from knowledge of the thermal characteristics of the second crystal, the sonde material, and its geometry.

Calculation of vertical distance $\Delta Z$ from the four pressure readings $P_0$, $P_1$, $P_2$ and $P_3$ as shown in FIG. 4, although not forming part of the present invention, is contained in the following Appendix.

APPENDIX

For a static fluid column, the pressure as a function of distance Z satisfies the differential equation $$\frac{dP}{dZ} = -\rho g. \tag{A.1}$$

Over the relatively short distance between the measuring stations in borehole gravity logging, it can generally be assumed that $\rho$ varies linearly with Z. Linearity of $\rho$ with Z implies that:

$$\rho = \rho_0 + m(Z - Z_0) \tag{A.2}$$

where $$m = \frac{\rho_3 - \rho_0}{Z_3 - Z_0} \tag{A.3}$$

A more convenient form of Eq. (A.2) is obtained by writing:

$$\rho = \rho_0 + m_1 Z \tag{A.4}$$

with $$m_1 = \frac{\rho_3 - \rho_0}{Z_3} = \frac{\rho_1 - \rho_0}{D} = \frac{\rho_3 - \rho_2}{D} \quad (A.5)$$

and Z now represents the distance above $Z_0$.

Inserting Eq. (A.4) into Eq. (A.1) and integrating yields:

$$P = -g\rho_0 Z - gm_1 \frac{Z^2}{2} + C, \quad (A.6)$$

where C is a constant of integration. For the lowermost point $Z_0$, P equals $P_0$ so that $$P = P_0 - g\rho_0 Z - gm_1 \frac{Z^2}{2} \quad (A.7)$$

Using Eq. (A.7), a set of equations can be developed for $P_1$ and $P_0$.

$$P_1 = P_0 - g\rho_0 D - g\left(\frac{\rho_1 - \rho_0}{D}\right)\frac{D^2}{2} \quad (A.8)$$

$$= P_0 - D\left(\frac{g\rho_0 + g\rho_1}{2}\right) \triangleq P_0 - D\bar{g\rho}_{01}$$

Likewise, $$P_2 = P_1 - \Delta Z\left(\frac{g\rho_1 + g\rho_2}{2}\right) \triangleq P_1 - \Delta Z \bar{g\rho}_{12} \quad (A.9)$$

and $$P_3 = P_2 - D\left(\frac{g\rho_2 + g\rho_3}{2}\right) \triangleq P_2 - D\bar{g\rho}_{23} \quad (A.10)$$

Thus, the pressure difference between points equals the product of average density between the points and the negative of the distance between the points.

From Eq. (A.4), it can be seen that $$\bar{g\rho}_{12} = \frac{g\rho_1 + g\rho_2}{2} = \frac{1}{2}\left(\frac{g\rho_0 + g\rho_1}{2} + \frac{g\rho_2 + g\rho_3}{2}\right) \quad (A.11)$$

$$= \frac{1}{2}\bar{g\rho}_{01} + \frac{1}{2}\bar{g\rho}_{23}$$

or in terms of pressures, $$\bar{g\rho}_{12} = \frac{\bar{g\rho}_{01} + \bar{g\rho}_{23}}{2} = \frac{1}{2}\left(\frac{P_0 - P_1}{D} + \frac{P_2 - P_3}{D}\right) \quad (A.12)$$

From Eqs. (A.9) and (A.12), it follows that:

$$\Delta Z = D + \frac{(P_1 - P_2)(2D)}{P_0 - P_1 + P_2 - P_3} = \frac{P_1 - P_2}{\bar{g\rho}_{12}} + D \quad (A.13)$$

In some cases, the true pressure values are not the ones recorded by the pressure transducers due to errors $\theta_i$. Instead, at each measurement location, a value $M_i$ related to the true valve $P_i$ is recorded wherein:

$$M_i = P_i + \theta_1 \quad (A.14)$$

A reasonable assumption is that the errors $\theta_i$ are randomly distributed with zero mean, have a common variance and are independent from one measurement to the next. To reduce any such error in the pressure measurements, a plurality of pressure measurements may be made by each pressure transducer at a given vertical location in the borehole. In a preferred mode of operation, two sets of pressures are measured at each such location. The first set is taken from the pair of pressure transducers before the borehole gravity measurements are made, and the second set is taken from the pair of pressure transducers following the borehole gravity measurements and before the pressure sonde and borehole gravity meter are advanced through the borehole to the next measurement location. Consequently, four pressure readings are taken for each borehole gravity mesurement. Thus, when it is believed that there are significant departures of the actual pressure readings $M_i$ from the true values $P_i$ and additional accuracy in the determination of $\Delta Z$ is required over that attainable through the solution of Eq. (A.13) above, the plurality of pressure readings are taken and processed as being from zero to three, j being from one to two, and the $M_{ij}$ rotation being the j th pressure reading at vertical postion i. These pluralities of pressure readings can be used to rewrite Eq. (A.13) for the vertical disance Z as follows:

$$\Delta Z = \frac{(M_{12} - M_{22})(2D)}{M_{01} - M_{11} + M_{21} - M_{31}} + D \quad (A.15)$$

I claim:

1. A method for conducting a gravimetry survey of subsurface formations surrounding a borehole comprising the steps of:

(a) traversing a borehole with a borehole gravity meter, (b) simultaneously traversing the borehole with a pressure logging sonde having a pair of pressure transducers located at spaced apart axial positions along said sonde and in fixed axial relationship with said borehole gravity meter, a first of said transducers being isolated from the borehole fluid and a second of said transducers being in contact with the borehole fluid so as to be directly exposed to both the borehole fluid pressure and temperature, whereby the thermal time constant of said second transducer is shorter than that of said first transducer, (c) periodically stopping the traverse of said borehole gravity meter and said pair of transducers to take borehole gravity and borehole fluid pressure measurements at a plurality of measurement locations having varying temperatures within the borehole, (d) thermally insulating said second pressure transducer from the borehole temperature to a greater extent than that of said first pressure transducer so as to lengthen the thermal time constant of said second transducer and decrease the thermal stabilization time between said first and second transducers, (e) utilizing the pair of pressure measurements at a first of said measurement locations and the pair of pressure measurements at a second of said measurement locations to determine the distance along the borehole between said first and second measurement locations, and (f) determining the bulk density of the formation surrounding the borehole from the plurality of gravity measurements and the distances traversed along the borehole between the taking of successive gravity measurements.

2. A borehole gravimetry system comprising:

(a) a logging cable, (b) a borehole gravity meter affixed to said cable, (c) a first pressure transducer affixed to said logging cable and isolated from the fluid within the borehole, (d) a second pressure transducer affixed to said logging cable in spaced relation to said first pressure transducer and in contact with the borehole fluid so as to be exposed to both the pressure and temperature of said fluid, whereby the thermal time constant of said second pressure transducer is shorter than that of said first pressure transducer, (e) means for insulating said second pressure transducer from the borehole temperature to increase its thermal time constant and decrease the thermal stabilization time with respect to said first pressure transducer, and (f) means for moving said logging cable through the borehole and stopping at successive measurement locations within the borehole to permit the taking of gravity and borehole fluid pressure measurements.

* * * * *